United States Patent [19]
Fleck et al.

[11] 3,740,561
[45] June 19, 1973

[54] DIMENSION CONTROLLING APPARATUS FOR DRAWING

[75] Inventors: Horst G. Fleck, San Antonio, Tex.; Martin Rome, Princeton; Joseph M. Wixted, Princeton Junction, both of N.J.

[73] Assignee: Western Instruments, Inc., Newark, N.J.

[22] Filed: May 5, 1971

[21] Appl. No.: 140,622

Related U.S. Application Data
[62] Division of Ser. No. 830,007, June 3, 1969, Pat. No. 3,622,291.

[52] U.S. Cl................................ 250/201, 250/219 S
[51] Int. Cl........................ G01j 1/20, G01n 21/30
[58] Field of Search ................. 250/219 S, 216, 201

[56] References Cited
UNITED STATES PATENTS
2,229,489  1/1941  Barnard........................... 250/219 S
2,895,373  7/1959  Eyraud ............................ 250/219 S FOREIGN PATENTS OR APPLICATIONS
1,153,541  8/1963  Germany......................... 250/219 S

*Primary Examiner*—James W. Lawrence
*Assistant Examiner*—T. N. Grigsby
*Attorney*—John P. Sonnott, William R. Sherman and Stewart F. Moore

[57] ABSTRACT

An illustrative embodiment of the invention is directed to method and apparatus for manufacturing microchannel devices. Typically, the individual glass tubes in a hexagonal bundle are sealed on one end to individual hangers from which they are suspended vertically in a furnace. A vacuum is drawn within the furnace so that the inner surfaces of the tubes, exposed to atmospheric pressure, will not collapse during heating and drawing. At temperature, the bundle is drawn and elongates under the controlled forces applied through a modified Atwood's machine to reduce the bundle cross section by a ratio of about 50 to 1. The elongated bundle is cut into lengths as it is drawn, and these individual lengths are stacked together within a tube of glass that has a higher melting point than the glass in the drawn lengths.

The channels are once more sealed and the assemblies are subjected to a secondary fusion process prior to slicing into thin discs. The annular glass rings are removed from the discs and the microstructures are placed in a molten wax bath in order to fill the channels with wax before grinding and polishing. After grinding and polishing, the wax is removed.

1 Claim, 7 Drawing Figures

FIG. 5
FIG. 6
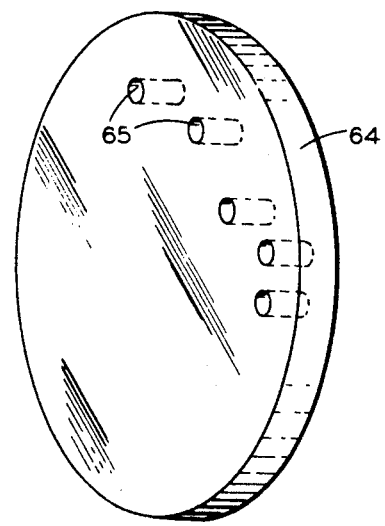
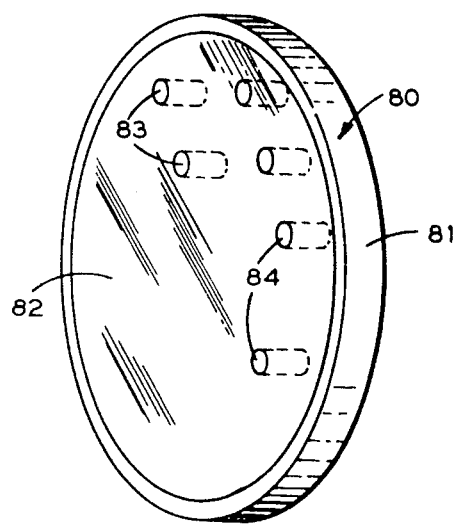
FIG. 3
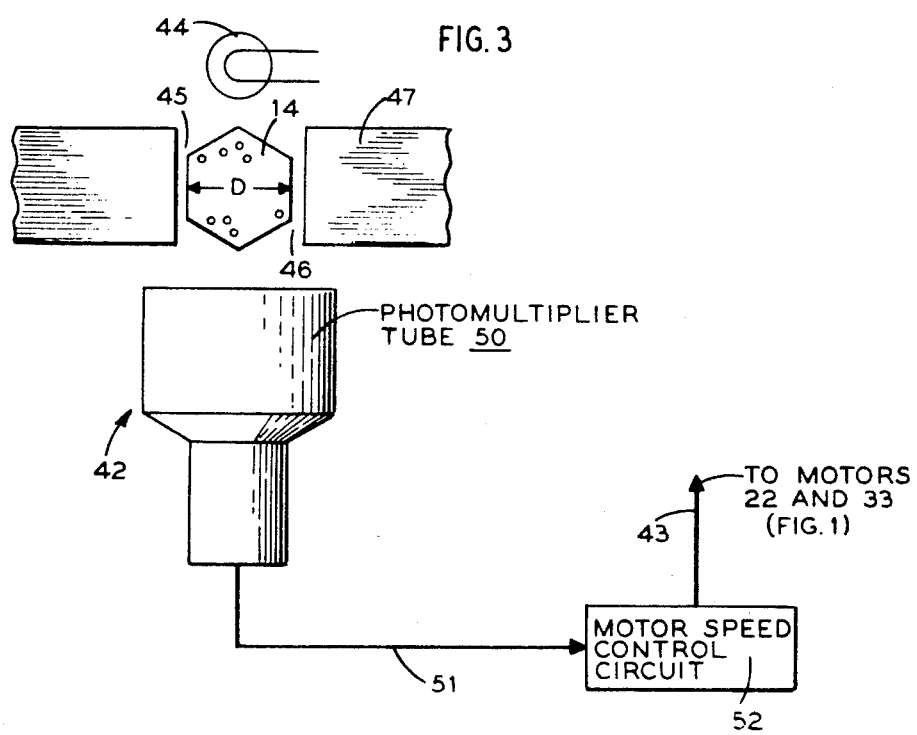

DIMENSION CONTROLLING APPARATUS FOR DRAWING

This application is a division of our prior application Ser. No. 830,007, filed June 3, 1969, now U.S. Pat. No. 3,622,291.

BACKGROUND OF THE INVENTION

1. Field of the Invention

This invention relates to manufacturing techniques, and more particularly, to method and apparatus for producing microchannel devices, and the like.

2. Description of the Prior Art

A need exists for thin microstructure discs in which the microchannels are arranged generally perpendicular to the disc sides. Microchannel devices are useful, for example, in channel electron multipliers and in chemical filters. Ideally, a channel electron multiplier for use in an image intensifier might contain thousands of pores in a disc that is about one-tenth of an inch thick. The individual channels, moreover, ought to be each on the order of hundredths of an inch in diameter in order to provide approximately a 50 to 1 ratio of length to diameter.

In order to manufacture structures of this sort, it has been suggested to arrange a bundle of glass rods in which each rod has an outer annulus and an inner core of different glasses. The bundle is heated and allowed to elongate under gravitational force until the desired individual channel diameters are achieved. On cooling, transverse slices in the drawn structure produce discs of the proper thickness. The solid inner core in each rod is dissolved with an acid that attacks the core glass without affecting the annular glass. This technique has been unsatisfactory, however, inasmuch as the acid does not produce an array of cylindrical microchannels but instead generates passageways that have generally hyperbolic cross sections, and therefore are of an unsatisfactory shape.

This solid core technique has been proposed in order to overcome the natural tendency of hollow glass tubes to collapse during the hot drawing process. Especially during a final or secondary fusion step, the tubes that form the mutually abutting boundaries of individual hexagonal elements often collapse and produce a "chicken wire" appearance on the surface of the disc. This, of course, is an intolerable defect for most applications, and leads to a production run that must be discarded.

Accordingly, a need exists for a microchannel production technique that enables hollow tubes to be used throughout, without allowing these tubes to collapse during processing.

SUMMARY OF THE INVENTION

In accordance with the invention, these problems are overcome through a differential pressure technique in which the air pressure within the channels is greater than the pressure in the furnace in order to prevent tube collapse during a two-stage heating and drawing process. During the primary draw, an end of each of the glass tubes is sealed. The tubes are then suspended in a vacuum furnace from novel hangers formed in the sealed ends. The lower ends of the tubes are open to the atmosphere while the tube support is evacuated.

The furnace, moreover, has a temperature gradient that produces the greatest heat at the top to prevent air circulation during drawing. At the proper temperature, the glass bundle starts to flow under the control of a modified Atwood's machine, in which the weight of the bundle is counterbalanced by means of an equivalent weight at the other end of a system of sheaves in order to eliminate the influence of gravity. As the tube bundle flow progresses, the length of the bundle within the bundle support is changed. The temperature gradient also may be adjusted in a corresponding manner to insure that the portion of the bundle remaining in the furnace is subjected to the proper temperature. Preferably, however, the temperature in the furnace is maintained constant and the rate of flow is adjusted through the control of a drawing mechanism. Typically, the feed rate of the bundle into the furnace is regulated visually to keep the transitional portion of the bundle within the furnace in a fixed vertical position relative to the furnace's heating elements.

The drawn portion of each bundle is cut into individual lengths. These length are grouped into another bundle to produce an array of several tens of thousands of hollow tubes. Both ends of the tubes in each of the primary lengths in this array are sealed in order to entrap air at atmospheric pressure in the microchannels.

The array then is placed inside a larger glass tube that has a somewhat higher melting point and slightly lower coefficient of thermal expansion than the glass from which the microchannels are made. To prevent void spaces from forming between the polygon-like periphery of the array of primary lengths and the cylindrical inner surface of the circumscribing glass tube, solid filling rods are inserted in the void spaces. The surface of the array of primary lengths that contact the wall of the tube, moreover, is treated with a coating of boron nitride in order to prevent the array from fusing to the glass tube. Preferably, the glass for the array of primary lengths has a slightly greater coefficient of thermal expansion than the glass for the outer tube. This choice of glasses enables the outer tube to shrink away from the inner lengths during cooling for easier removal and for compression that aids fusion of the lengths during subsequent heating.

The entire assembly is suspended vertically once more in a furnace for a secondary step. The secondary process is carried out in a manner that combines the group of individual lengths into a fused array of microchannels.

After cooling, the secondary product is cut transversely to produce a thin disc from which is removed a glass ring that was cut from the outer tube. The microchannel disc is placed in a vacuum in order to remove air from the individual channels before it is immersed in an optical grinding wax. The wax fills the evacuated microchannels to prevent grinding and polishing debris from filling the channels. After grinding, the wax is heated and removed from the channels in order to produce a finished microchannel structure.

For a better understanding of the present invention together with other and further objects thereof, reference is had to the following description taken in connection with the accompanying drawings, the scope of the invention being pointed out in the appended claims.

BRIEF DESCRIPTION OF THE DRAWING

FIG. 3 shows a typical apparatus for controlling the dimensions of the drawn product;

FIG. 5 is a representative embodiment of a typical finished product;

FIG. 6 is a representative embodiment of a typical sliced disc resulting from a secondary process.

DESCRIPTION OF THE PREFERRED EMBODIMENTS

Figure 1:
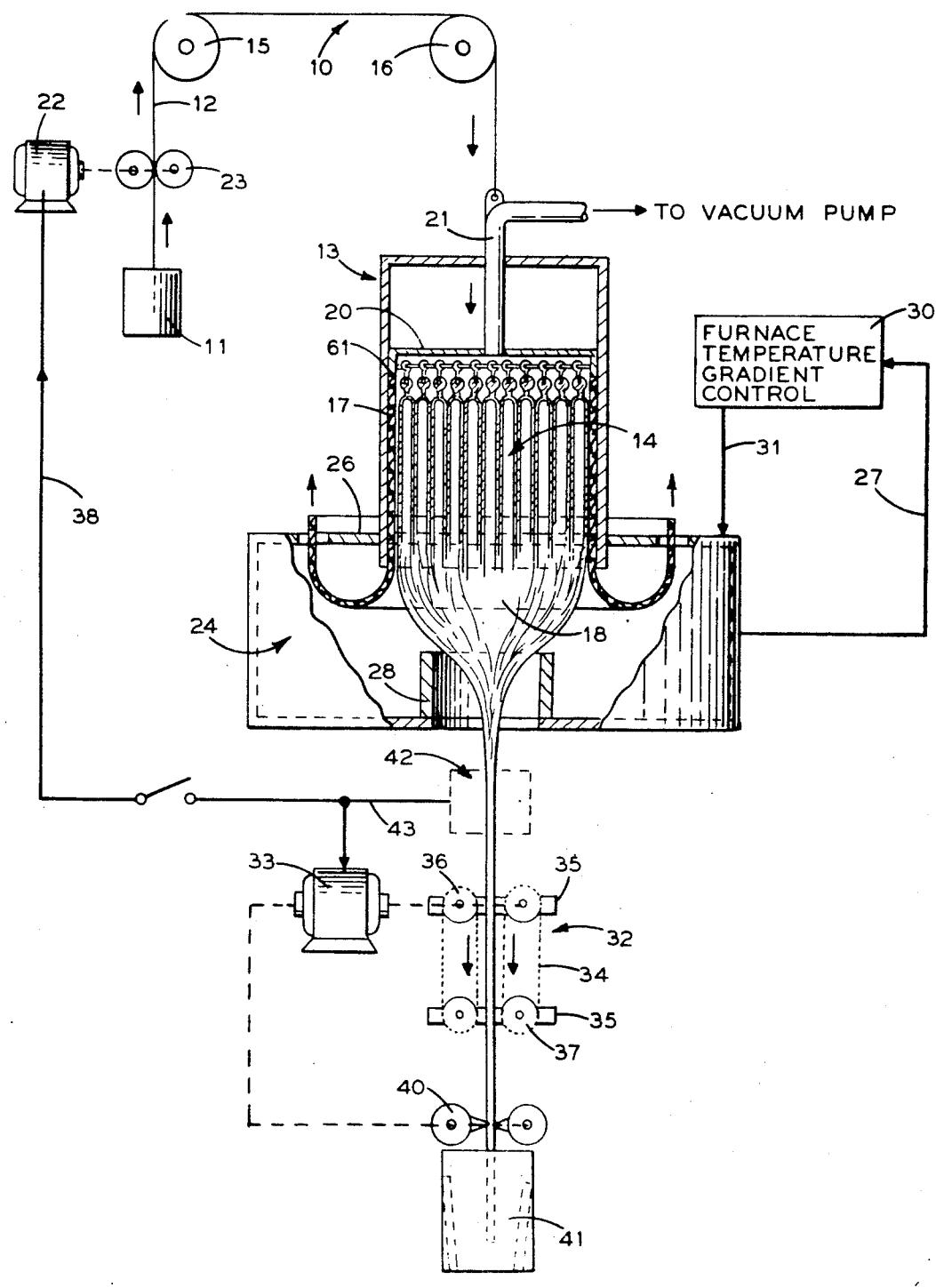
FIG. 1 shows a typical apparatus for practicing the invention.

FIG. 1 shows a typical apparatus for producing microchannel structures in accordance with the principles of the invention. The embodiment in FIG. 1, moreover, illustrates a primary draw in which a large hexagonal bundle of cylindrical glass tubes are being drawn to a much smaller cross section in which a ratio of size reduction of 50 to 1 is typical. After the primary draw is finished, the primary lengths are sealed on both ends and grouped together for a second process that provides the final product. It has been found in this regard that Corning 8161 glass tubes of 0.100 inch outside diameter are readily adapted to this process. Thus, as shown in FIG. 1, a modification of Atwood's machine 10 (in which a weight 11 is connected through a cable 12 to a substantially air-tight support 13 for a glass tube bundle 14) is used. The bundle 14 may contain one thousand or more individual tubes. Preferably, the bundle of glass tubes has a hexagonal cross section, although other shapes also are suitable.

The cable 12 is passed over two sheaves 15 and 16. The bundle 14, moreover, is encased in a flexible, thermally insulating shroud 17 that depends from a vertically movable supporting member 20. The supporting member 20 is attached to an end of the cable 12 for vertical position control. The supporting member 20 also is connected through a conduit 21 to a vacuum pump (not shown) in order to establish a vacuum environment for the bundle 14.

The shroud 17 may comprise six flexible asbestos cloth members each parallel to and in physical contact with a respective one of the flat sides of the hexagonal bundle 14. This arrangement provides a sufficiently airtight enclosure for the bundle 14 to accomplish the primary draw.

A variable speed motor 22 and cable driving wheels 23 adjust the vertical position of the tube bundle 14. The motor speed is set as a function of the diameter of the bundle 14, the viscosity of the glass, and speed of the process to maintain an output volume that is equal to the volume of the bundle input to a furnace 24. Alternatively, the speed of the motor 22 can be adjusted automatically in response to changes in the primary draw product size, as hereinafter described. Thus, the tube bundle 14, the shroud 17 and the support conduit 21 are lowered into the furnace 24.

As shown, the furnace 24 produces a vertical temperature gradient that increases with the height of the furnace. For example, a temperature of 1175°F at furnace top 26 has been found satisfactory. In this manner, convective air currents are eliminated within the furnace 24, inasmuch as the higher temperature at the furnace top 26 substantially prevents the development of vertical air motion.

The lower portion of the support 13 is nested within the upper portion of the furnace 24 to insure that the tube bundle 14 first reduces in size within the furnace in a bundle transitional portion 18. Should the bundle begin size reduction in the support 13, rather than in the furnace 24 as shown, the vacuum within the support will be dissipated and produce undesirable collapsed channels under the influence of external atmospheric pressure. The conduit 21 that supports the tube bundle 14 passes through an airtight gland (not shown) in the top of the support 13. As shown schematically in FIG. 1, the furnace temperature gradient is controlled automatically through signals from thermocouples within the furnace 24 that are sent through conductor 27 to a furnace temperature gradient control circuit 30 that responds to these signals through the application of power through a cable 31 that is appropriate to the individual heating elements within the furnace. A typical furnace for practicing the invention may have an interior height of 44 inches and an internal diameter of 18 inches. Twelve 1000-watt heating elements arranged in a hexagon also are used in the furnace 24. This furnace, moreover, establishes a temperature gradient that illustratively may vary from 625°F at the lower end of the furnace to 1170°F at the furnace top 26. In order to distribute heat more uniformly within the lower portion of the furnace 24, a heat modifying cylinder 28 is provided. The cylinder 24 circumscribes the flowing portion of the bundle 14 and extends through approximately the lower third of the furnace 24.

Under the influence of the furnace temperature and a drawing mechanism 32, the bundle 14 decreases in diameter and flows downwardly. An illustrative drawing mechanism 32 is shown below the furnace 24. It comprises a motor 33 that is connected to a chain drive drawing apparatus 34. The drawing apparatus 34 is equipped with high temperature rubber grips 35 that pass over upper and lower pairs of sheaves 36 and 37 in order to enter opposing registration with each other and with a "pulled" portion of the tube bundle 14. These pairs of grips draw the flowing portion of the bundle 14 vertically downward in lengths that are equal to a desired predetermined height of, for example, 15 inches.

Also coupled to the motor 33 are a pair of cutting edges 40. The cutting edges 40 are synchronized with the operation of the grips 35 to enable the cutting edge to slice off pulled segments of the bundle 14 at the point of engagement with the grips 35. Synchronizing the cutting edges 40 with the movement of the grips 35 reduces the wasted or damaged portion of each pulled length that is inherent in gripping and drawing the hot glass. After cutting, the primary draw lengths are received in a container 41 and are stored for subsequent processing.

In practicing the invention, the temperature gradient in the furnace 24 is maintained at a level in which the tube bundle 14 flows under the influence of the drawing mechanism 32, but has not melted. In this connection, the aforementioned temperature of 1170°F at the top 26 of the furnace 24 has been found satisfactory when Corning 8161 glass is drawn.

The rate at which the primary draw progresses may be controlled through an automatic dimension checking system 42 which, in response to changes in transverse dimension of the pulled portion of the bundle 14 sends signals through a conductor 43 that regulate the speed of the variable speed motor 33 in the drawing mechanism 32. These signals also are sent through a conductor 38 to the motor 22 in order to control the position and feed rate of the bundle 14. Accordingly, these signals regulate the speed of the motor 33 so that the transitional portion 18 of the bundle 14 is kept in the same position in the furnace 24.

A typical apparatus for controlling the operation of the drawing mechanism 32 is shown in FIG. 3. An electric lamp 44 radiates a beam of light that is parallel to two of the flats in a pulled portion of the hexagonal glass bundle 14. Light beams traverse slits 45 and 46 that are formed between a collimator 47 and the opposing flats of the bundle 14.

These light beams are registered on the photosensitive surface of a photomultiplier tube 50. The photomultiplier tube 50 generates an electrical signal in response to changes in intensities in the light beams that are related to changes in the width of the slits 45 and 46 or the transverse distance D across the flats in the bundle 14. This signal is sent through a conductor 51 to a motor control circuit 52 that regulates the speeds of the motors 22 and 33 to regulate properly the drawing speed and the position of the transitional portion 18 of the bundle 14 as the distance D increases or decreases beyond a predetermined range of, for example, 0.030 inches.

Figure 2:
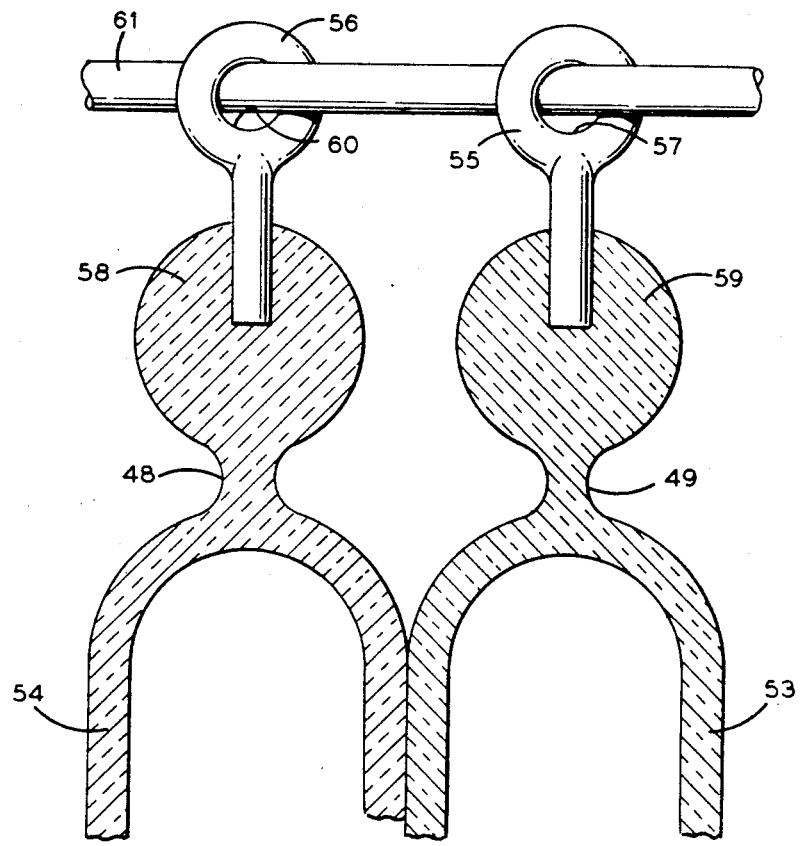
FIG. 2 shows a hanger arrangement for individual tubes used in the embodiment of the invention.

Ordinarily, the bundle 14 is suspended from the support 13 in the manner illustrated in FIG. 2. Two glass tubes 53 and 54 are fused to metal hangers 55 and 56, respectively. To enable the coefficient of thermal expansion of the hangers 55 and 56 to match that of the glass tubes 53 and 54, the hangers usually are made of Kovar. The Corning glass No. 8161, moreover, that is used in the illustrative embodiment of the invention, has a coefficient of thermal expansion of $81 \times 10^{-7}$ inches/inch/°C. Each of the hangers 55 and 56 is provided with an enlarged area that protrudes from respective bulbous glass portions 58 and 59 that are formed in the sealed ends of the tubes 53 and 54. The bulbous portions 58 and 59 are exceptionally useful when all of the tubes are packed together in a hexagonal array. In this situation, stresses developed in the sealed tube ends may cause breakage at the narrow solid glass portions 48 and 49. The sealed integrity of the tubes 53 and 54, however, is not destroyed inasmuch as the broken narrow portions 48 and 49 do not place the interior surfaces of the hollow portions of the tubes into free communication with the atmosphere.

Figure 4:
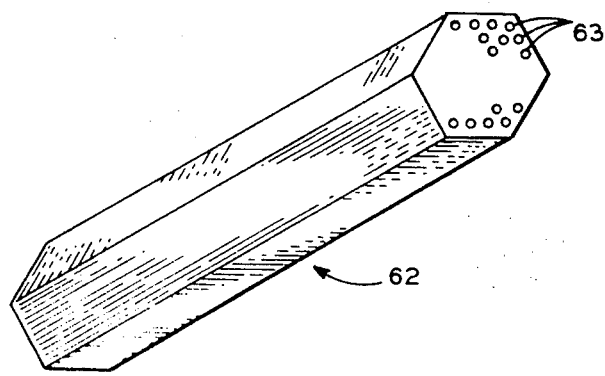
FIG. 4 shows a characteristic hexagonal length produced during a primary draw.

FIG. 5 shows a typical microchannel disc 64. The disc 64 is produced through a secondary process that comprises assembling hexagonal lengths 62 into a large array and fusing the microchannels 63 closed at both ends in each of the lengths 62 (FIG. 4). Air at atmospheric pressure is thus sealed within all of the microchannels and prevents these microchannels from collapsing during further processing as described subsequently.

The array of primary draw lengths is placed within a cylindrical glass tube (not shown) that has a higher melting point than that which characterizes the glass that forms the length 62. In this connection, Corning 7052 glass having a coefficient of expansion of $45 \times 10^{-7}$ inches/inch/°C has been found satisfactory for this purpose. Inasmuch as the individual lengths 62, when placed within the cylindrical glass tube, do not fully conform to a circular surface, void spaces between the peripheral lengths 62 and the inner surface of the glass tube are filled with solid rods of Corning 8161 glass that are of .030 inch to .010 inch in diameter. In order to prevent the individual lengths 62 from fusing to the annular glass tube, the tube is treated with an inner coating of boron nitride that prevents fusion between the two structures.

Figure 7:
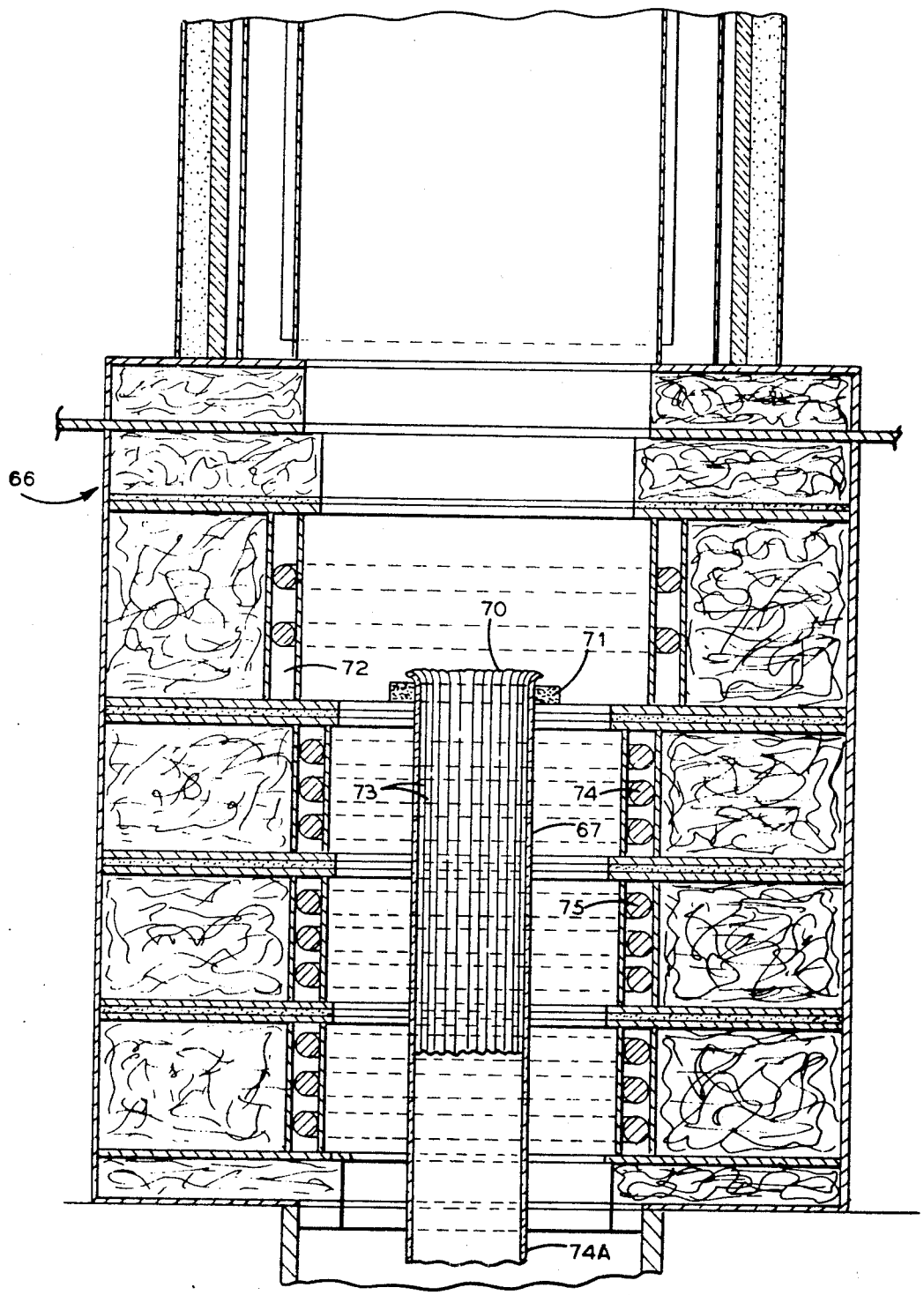
FIG. 7 is a schematic diagram of a typical furnace for carrying out the secondary process.

The secondary process is accomplished with a different furnace 66 (FIG. 7). An outer glass cylinder 64 is suspended vertically in the furnace 66 through a flared top portion 70 that extends across a portion of the top of a carbon block 71 that rests on a ledge in a topmost heating zone 72.

It will be recalled that both ends of each length 73 from the primary draw are sealed in order to trap air within each of the microchannels. The glass cylinder 67 has a skirt portion 74 that extends below the lower ends of the lengths 73 and protrudes from the lower end of the furnace 66. A vacuum is drawn (not shown) in the tube 73 to evacuate the interstices between each of the primary draw lengths 73. On reaching a temperature of about 580°C in the heating zone 72, the sealed uppermost ends of the lengths 73 "blow out." This blow-out exposes the microchannels to atmospheric pressure, and squeezes together the outer surfaces of the individual lengths 73 under the vacuum in the tube 67 in order to preserve the vacuum-tight integrity of the interstices at the upper end of the cylinder 67.

Thus exposed to atmospheric pressure vacuums on one side and a vacuum on the other side, the boundaries between each adjacent length close up to form a unified mass without crushing the boundary microchannels and producing an undesirable chicken wire effect. The temperature in heating zones 74 and 75 after blow-out (which prior to blow-out had been lower than the temperature in the zone 72) is gradually increased until it reaches about 545°C. At the same time, the zone 72 temperature is reduced to about 520°C. These relative temperatures are held for about thirty minutes to enable the common outer surfaces of the entire array of the lengths 73 to close up and fuse together. After fusion is complete along the entire array, temperatures in the zones 72, 74 and 75 are reduced gradually to room temperature. This heating procedure is controlled in the foregoing manner to insure atmospheric gas pressure within the channels. If any channel in the blown-out upper portion of the tube reseals, the gas pressure within that channel will increase to several atmospheres under the influence of the furnace temperature, causing at least some damage to the structure due to sealed microchannel bursting.

The assembly in the glass cylinder 67 is not necessarily drawn for a further reduction in diameter. The array of lengths usually are treated in the foregoing manner only to fuse together and form a microchannel structure.

After the secondary process is complete, wafers 80 (FIG. 6) are sliced form the array with a thickness that is slightly greater than that which is desired in the finished product. An outer ring 81 that is cut from the tube of Corning 7052 glass is removed from the microstructure disc, having been treated previously with boron nitride to prevent fusion with the drawn microstructure 82. As shown in FIG. 6, the microstructure 82 includes not only microchannels 83, but also peripheral groups of solid glass rods 84 that were used to fill the void spaces between the irregular periphery of the array of primary lengths and the cylindrical surface of the outer ring 81.

Turning once more to FIG. 5, the disc 64 is placed in a vacuum environment of about 20 microns in order to evacuate air from the microchannels 65. While still within the vacuum, and after the microchannels 65 have been evacuated, the disc 64 is immersed in a bath of molten wax. Typically, an ordinary optical grinding wax compound that contains three parts cerasin and one part rosin has been found suitable. The wax-filled disc is removed from the vacuum environment for grinding and finishing. Preferably, the microstructure is ground on a felt paper pad that contains a grinding compound of which aluminum oxide and cerium oxide have been found satisfactory. Preferably, the grinding compound grit should be either much larger than the microchannel diameter or much smaller than the microchannels in order to reduce the chance for channel obstruction through grinding compound particles that are about the same size as the channels. Thus, for example, cerium oxide having a grit size of 0.3 microns in a nonsettling suspension is well suited for this use.

After grinding is finished, the ground disc is warmed and the wax in the microchannels 65 is removed, the wax having served the purpose of keeping grit and other grinding debris out of the channels during the grinding operation. The wax also served as a physical support for the frail microstructure during the grinding process. After the wax has been removed, the disc 64 is ready for use. In the case of 8161 glass, moreover, it is preferable to keep the disc in a nitrogen atmosphere in order to prevent the glass structure from weathering.

It should be noted that the individual tubes from which the microstructure is made may have any suitable cross section. For example, rectangular and hexagonal inner and outer surfaces are suitable for use in connection with the invention, although circular cross sections have been shown in connection with the detailed description of the invention. Choice of glass, temperatures, specific expansion coefficients and the like, also are a flexible matter, depending on the sort of glasses that are selected for use in the process described.

The microchannels are cleaned, for example, with Cobehn solvent (an anhydrous ethyl alcohol and trichloromethane solution) which has been put through a Soxhlet extractor that is connected to a centrifuge in which the microchannel discs are placed at the extremities of the centrifuge rotor. In this way the microchannels are subjected to fresh solvent flowing into the rotor from the extractor. The solvent, moreover, is applied to the discs under centrifugal force and thus provides uniformly clean microchannels.

What is claimed is:

1. Apparatus for controlling the dimension of a microchannel structure comprising a light source, a light collimator spaced from the source and having the microchannel structure in the collimator, a photoresponsive device responsive to light from the collimator to produce a signal representative of the dimension of said microchannel structure, motor means for regulating the passage of a microchannel structure through the collimator, said motor means including a motor for drawing the microchannel structure through the collimator, and motor control means for varying the speed of said motor of the motor means in response to said signal produced by said photoresponsive device.

* * * * *